US007184720B2

(12) United States Patent
Poutanen et al.

(10) Patent No.: US 7,184,720 B2
(45) Date of Patent: Feb. 27, 2007

(54) METHOD AND DEVICE FOR SIMULATING RADIO CHANNEL

(75) Inventors: Torsti Poutanen, Salo (FI); Jussi Harju, Hombrectikon (CH); Ari Seppälä, Espoo (FI); Juha Kemppainen, Oulu (FI); Juha Meinilä, Kuopio (FI); Tommi Jämsä, Oulu (FI)

(73) Assignee: Elektrobit Testing Oy, Oulunsalo (FI)

( * ) Notice: Subject to any disclaimer, the term of this patent is extended or adjusted under 35 U.S.C. 154(b) by 573 days.

(21) Appl. No.: 10/468,302

(22) PCT Filed: Feb. 20, 2002

(86) PCT No.: PCT/FI02/00138

§ 371 (c)(1),
(2), (4) Date: Aug. 20, 2003

(87) PCT Pub. No.: WO02/067471

PCT Pub. Date: Aug. 29, 2002

(65) Prior Publication Data

US 2004/0088628 A1    May 6, 2004

(30) Foreign Application Priority Data

Feb. 21, 2001  (FI)  .................................. 20010337

(51) Int. Cl.
*H04B 1/04* (2006.01)
(52) U.S. Cl. .................... 455/113; 455/102; 455/115.1; 455/118; 455/120; 455/125

(58) Field of Classification Search ................ 455/113, 455/102, 115.1, 118, 120, 125
See application file for complete search history.

(56) References Cited

U.S. PATENT DOCUMENTS

| 4,977,607 | A | 12/1990 | Maucksch et al. ............ 455/10 |
|---|---|---|---|
| 5,771,439 | A * | 6/1998 | Kennedy et al. ........... 455/63.1 |
| 6,058,261 | A | 5/2000 | Rapeli ................... 395/500.27 |
| 6,285,720 | B1 * | 9/2001 | Martone ..................... 375/262 |
| 6,724,730 | B1 * | 4/2004 | Mlinarsky et al. .......... 370/241 |
| 7,020,451 | B2 * | 3/2006 | Sugar et al. ................ 455/323 |

FOREIGN PATENT DOCUMENTS

| WO | WO 93/2062 | 10/1993 |
|---|---|---|
| WO | WO 01/17301 A1 | 3/2001 |

OTHER PUBLICATIONS

J. Heinänen et al., "Multipath fading simulation for design verification in digital baseband domain," 3G Mobile Communication Technologies, Conference Publication No. 471, 2000, pp. 376-380.

* cited by examiner

*Primary Examiner*—Matthew Anderson
*Assistant Examiner*—Minh Dao
(74) *Attorney, Agent, or Firm*—Finnegan, Henderson, Farabow, Garrett, & Dunner, L.L.P.

(57) ABSTRACT

The invention relates to a method and device for performing channel simulation, the device comprising a set of channel simulation units (200 to 214) for simulating a radio channel, each unit comprising radio frequency parts (200A to 214A) and baseband parts (200B to 214B). In the solution of the invention, the baseband parts of several different units (200 to 214) are arranged to simulate the same channel.

15 Claims, 5 Drawing Sheets

METHOD AND DEVICE FOR SIMULATING RADIO CHANNEL

FIELD OF THE INVENTION

The invention relates to a method and a device implementing the method for simulating a radio channel. The invention relates especially to implementing a multi-path radio channel simulator.

BACKGROUND OF THE INVENTION

One essential problem in radio systems is the rapid variation of the properties of a radio channel with time. This relates especially to mobile systems, in which at least one of the participants in a connection is often mobile. The attenuation and impulse response of the radio channel then vary within a wide phase and amplitude range even thousands of times per second. The phenomenon is random by nature, so mathematically it can be described by statistical means. The phenomenon complicates the design of radio connections and the used devices.

There are many reasons for the variation in a radio channel. When transmitting a radio frequency signal from a transmitter to a receiver in a radio channel, the signal propagates along one or more paths, in each of which the phase and amplitude of the signal vary, which causes fades of different lengths and strengths in the signal. In addition, noise and interference from other transmitters also disturbs the radio connection.

A radio channel can be tested either under actual conditions or using a simulator that simulates the actual conditions. Tests conducted in actual conditions are difficult, because tests taking place outdoors, for instance, are affected for example by the weather and season that change all the time. Even measurements taken in the same place produce a different result at different times. In addition, a test conducted in one environment (city A) does not fully apply to a second corresponding environment (city B). It is also usually not possible to test the worst possible situation under actual conditions.

However, with a device simulating a radio channel, it is possible to very freely simulate a desired type of a radio channel between two radio devices in such a manner that the radio devices operate at their natural transmission rates, just like in an actual operating situation. FIG. 1 illustrates an example of a device for simulating a radio channel. The figure shows a first set of devices 100 to 108 and a second set of devices 110 to 118, and a channel simulator 120. The first set of transmitters 100 to 108 can comprise mobile phones, for instance, that through their antenna connectors are connected to the inputs of the channel simulator 120. The second set of devices 110 to 118 can in turn be receivers of base station equipment that are connected to the outputs of the channel simulator. The number of the first and second devices need not be the same. In the example of the figure, there are five devices in each set.

A channel simulator typically comprises several channel elements that are capable of simulating and modelling a desired channel type. The channel simulator of FIG. 1 comprises eight elements. Each element comprises both a radio frequency part and a baseband part. A signal can be fed to the input of the channel simulator either in radio frequency or baseband format. In the latter case, the radio frequency parts of the channel elements are bypassed. In the radio frequency part, a signal is converted to baseband, and the resulting baseband signal is forwarded to the baseband parts, in which the impact of the channel fade is added to the signal.

In prior-art solutions, the channel element forms a fixed unit. As in the case of FIG. 1, there may be situations during simulation, in which not all channel elements are used, because there are fewer channels to simulate than the device has capacity for.

BRIEF DESCRIPTION OF THE INVENTION

One object of the invention is thus to implement a method and a device implementing the method in such a manner that the capacity of a channel simulator can be utilized optimally in different situations and that the simulator can easily be updated. This is achieved by a method for simulating a radio channel, in which the radio channel is simulated by means of channel elements that comprise a radio frequency part and a baseband part and in which a signal of one radio frequency part is processed in more than one baseband part.

The invention also relates to a device for performing channel simulation, which comprises a set of means for simulating a radio channel, each means comprising radio frequency parts and baseband parts. In the device of the invention, the baseband parts of several different means are arranged to simulate the same channel.

Preferred embodiments of the invention are disclosed in the dependent claims.

The invention is based on the idea that each baseband part is capable of connecting the baseband part inputs and outputs to adjacent baseband parts. In a digital radio channel simulator, the channel is modelled in the baseband parts with a FIR (Finite Impulse Response) filter that forms a convolution between the channel model and the input signal in such a manner that the signal that is delayed by different delays is weighted by channel coefficients, i.e. tap coefficients, and the weighted signal components are summed. The channel coefficients are altered to correspond to the behaviour of an actual channel. By enabling a flexible distribution of the baseband parts, multiple signal propagation paths in the channel can be simulated, if necessary. Multiple propagation paths require multiple FIR taps, and by combining different baseband parts in the solution according to the preferred embodiments of the invention, it is possible to achieve a higher number of taps than in prior-art solutions.

When the simulation to be performed is defined in a channel simulator, i.e. its parameters, such as the number of channels to simulate, the number and connections of input and output signals, are fed in, a control unit of the channel simulator optimises the use of the simulator equipment on the basis of the parameters. If all radio frequency units of the equipment are not needed during the simulation, the baseband units corresponding to them can be utilized during the simulation. The control unit controls the connections of the input and output signals of the baseband units so that several baseband parts simulate the same channel, and thus, the full capacity of the equipment is utilized.

In a preferred embodiment of the invention, the baseband part is divided into two separate modules, an interface module that comprises the input and output parts of the baseband part and a digital module that comprises the component needed for the actual channel modelling, such as the FIR filter. By thus dividing the baseband part into two different modules, significant advantages are gained in the maintenance and updatability of the device.

BRIEF DESCRIPTION OF THE FIGURES

The invention will now be described in more detail by means of preferred embodiments and with reference to the attached drawings, in which.

DETAILED DESCRIPTION OF THE INVENTION

Figure 1:
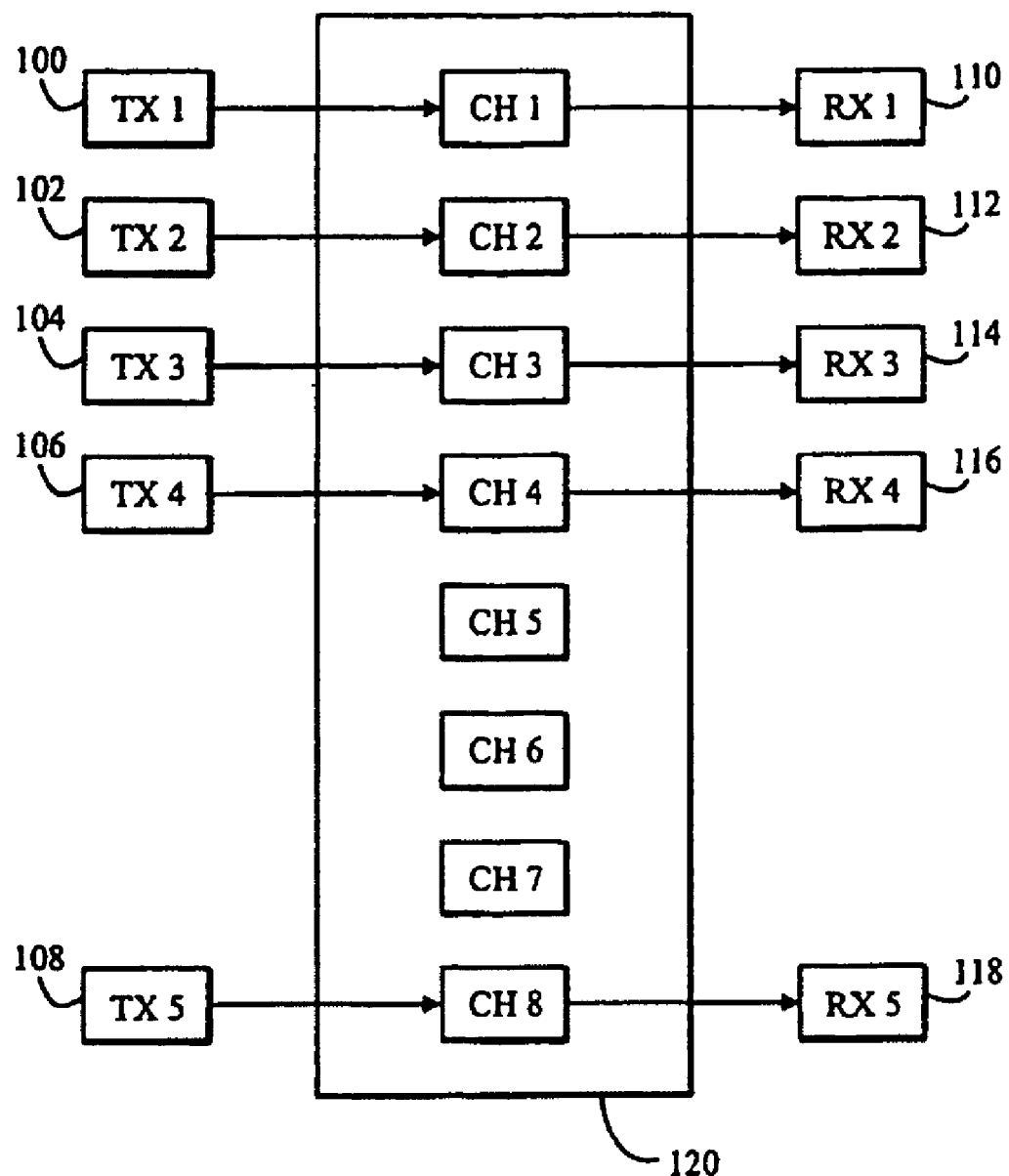
FIG. 1 shows the general structure of a channel simulator that was already described above.
Figure 2:
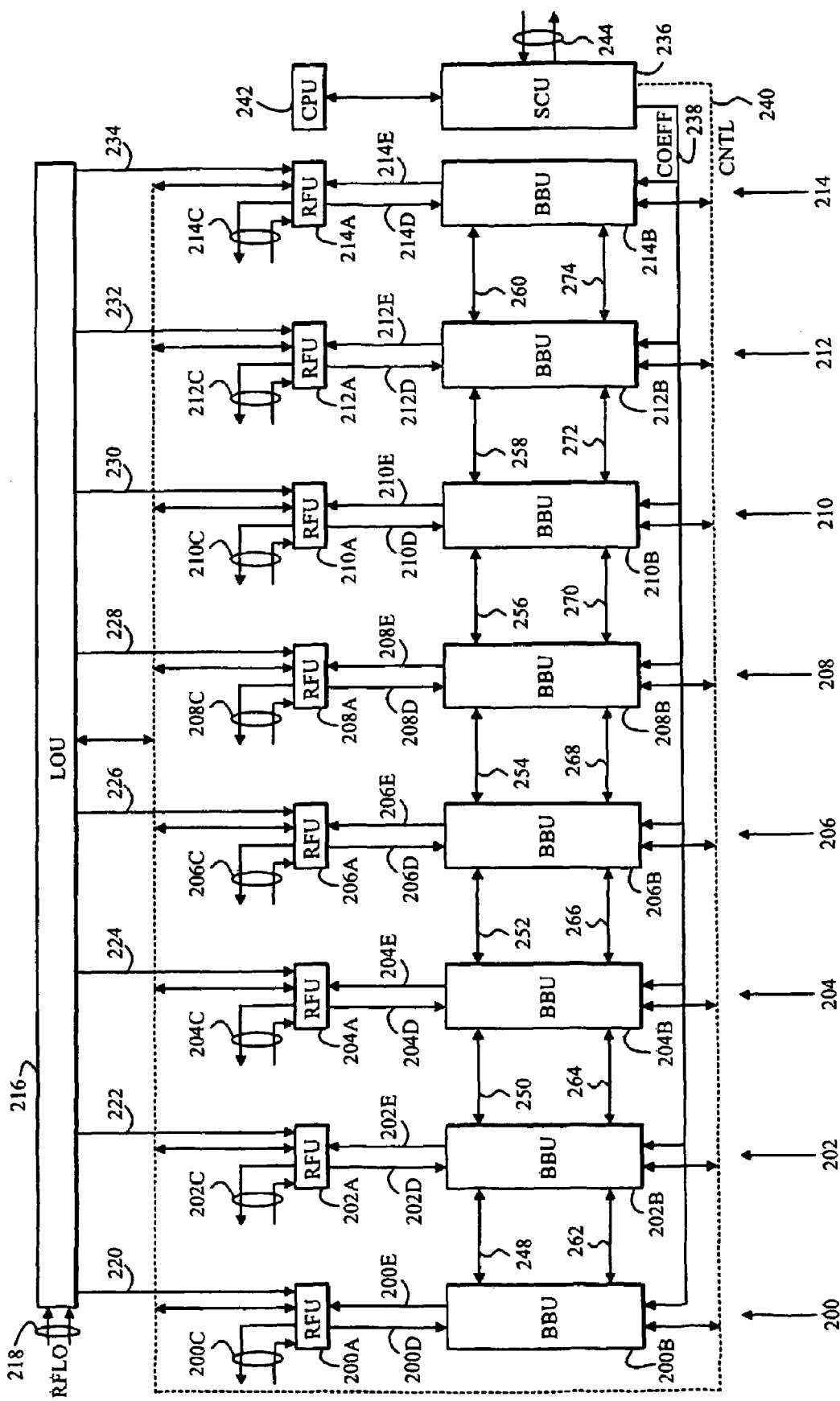
FIG. 2 illustrates in more detail an example of the structure of a channel simulator.

Let us examine the channel simulator of FIG. 2. The simulator comprises eight channel elements 200 to 214, each of which is made up of a radio frequency part 200A to 214A and baseband part 200B to 214B. Each radio frequency part comprises a radio frequency input signal from a transmitter and an output signal to a receiver 200C to 214C. The simulator further comprises a local oscillator divider 216 that receives as input one or more radio frequency local oscillator signals 218. The divider 216 divides a suitable radio frequency signal 220 to 234 for each radio frequency unit 200A to 214A.

In the radio frequency units 200A to 214A, the signals from the transmitter are converted to baseband for instance by multiplying them by a local oscillator signal, after which the baseband signal 200D to 214D is forwarded to the baseband units. A baseband signal 200E to 214E arrives from the baseband units to the radio frequency units through the simulated channel and is converted back to radio frequency in the radio frequency units and transmitted to the receiver.

In the baseband units 200B to 214B, the impact of the channel fade is added to the signal. This is typically done by FIR filters. The desired form of the channel is achieved by adjusting the tap coefficients of the FIR filter. The channel simulator comprises a simulator control unit (SCU) 236 that controls the tap coefficients of the FIR filters of the baseband units by means of a control bus 238. The simulator control unit also controls the operation of the entire simulator by means of a control bus 240. Information on simulation parameters, such as frequency parameters, gains and the like, are transmitted prior to the simulation over the control bus to the different parts of the device.

The channel simulator further comprises control means 242 that control the operation of the entire simulator. The control means are preferably implemented by means of a processor or computer and suitable software. The processor can naturally be replaced by a programmable logic made up of separate components. The control means further comprise interface equipment, such as a display and keyboard, by means of which the simulation parameters can be entered into the device. The parameters typically comprise the number of transmitters, the number of receivers, the number of channels to be simulated and their properties. The control means 242 control the simulator through the simulation control unit 236. The simulation control unit 236 also comprises an input and output 244 of a synchronization signal, by means of which several channel simulators can be synchronized. Thus, several devices can be connected parallel to implement a wide simulation.

The baseband units of the channel simulator also comprise connections between each other. A signal coming from the radio frequency unit that has not yet passed through the FIR filter is connected from each baseband unit to the adjacent baseband units, preferably to the inputs of the FIR filters in these units. These connections are illustrated in FIG. 2 by connections 248 to 260. Further, from each baseband unit a FIR filter output signal is connected to the adjacent baseband units, preferably to be summed in the outputs of the FIR filters in these units. These connections are illustrated in FIG. 2 by connections 262 to 274.

The channel simulator can also operate directly on baseband, in which case conversions to and from baseband are not necessary in the radio frequency units. A radio-frequency, analogue or digital signal can be fed as an input signal to the channel simulator.

Figure 3:
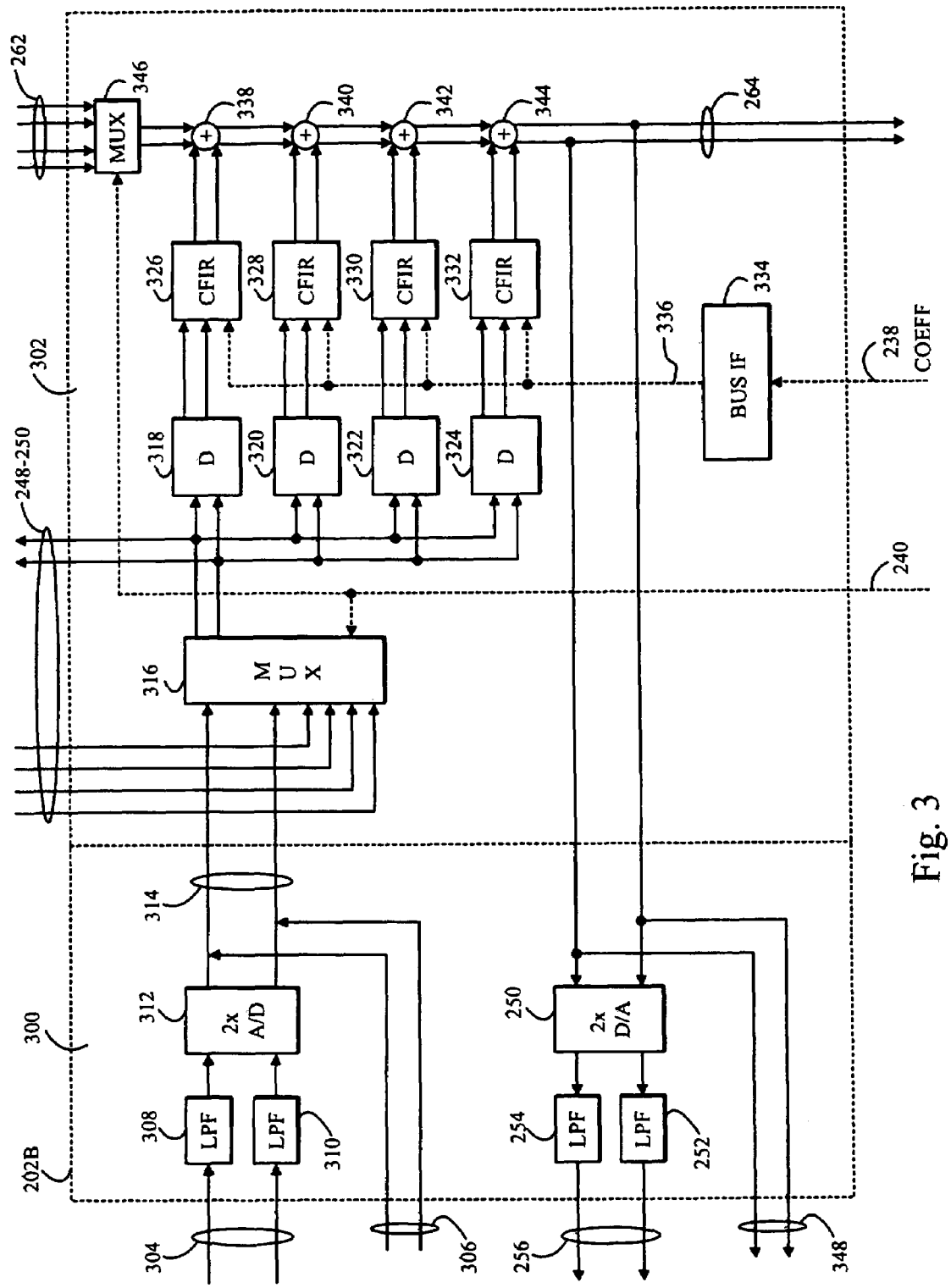
FIG. 3 is an example of the structure of a baseband part.

FIG. 3 illustrates the structure of a baseband unit according to a preferred embodiment of the invention. The baseband unit 202B of FIG. 2 is used as an example. The baseband unit is divided into two separate modules, i.e. a interface module 300 that comprises the input and output parts of the baseband part and a digital module 302 that comprises the components required in the actual channel modelling. An analogue 304 or digital 306 transmitter signal arrives at the interface module as input from the radio frequency unit. The signal comprises separate I-branch and Q-branch signals. Analogue inputs 304 are forwarded through low-pass filters 308 and 310 to analogue-to-digital converters 312.

The digital I and Q signals 314 are next forwarded to a multiplexer 316 in the digital module 302. Digital-format I and Q signals 248 to 250 arrive as other inputs to the multiplexer from the adjacent baseband units. Correspondingly, the I and Q signals are forwarded as outputs 248 to 250 to the adjacent baseband units.

The multiplexed I and Q signals are FIR filtered in a known manner, whereby the impact of the channel is added to the signals. The I and Q signals are first forwarded to a set of delay elements 318 to 324, the delay of each of the elements being separately settable. The signals that have been delayed in different ways are forwarded from the delay elements to complex FIR filter elements 326 to 332. The control bus 238 from the simulation control unit sets the tap coefficients of the FIR elements, the control bus being transmitted to the FIR elements as control data 336 through a bus adapter 334. The outputs of the FIR elements are summed in adders 338 to 344, to which the outputs 262 of the FIR elements of the adjacent baseband units are also brought for summing through a multiplexer 346. The sum total 264 is taken onward to the adjacent baseband elements. The sum is also forwarded to the interface module 300 and from there on either directly in digital format out 348 or through digital-to-analogue converters 350 and low-pass filters 352, 354 in analogue format 256 out to the radio frequency unit.

In a preferred embodiment of the invention, the control bus 240 from the simulation control unit controls the multiplexers 316 and 346, by means of which connections between different baseband units are adjusted.

Figure 4:
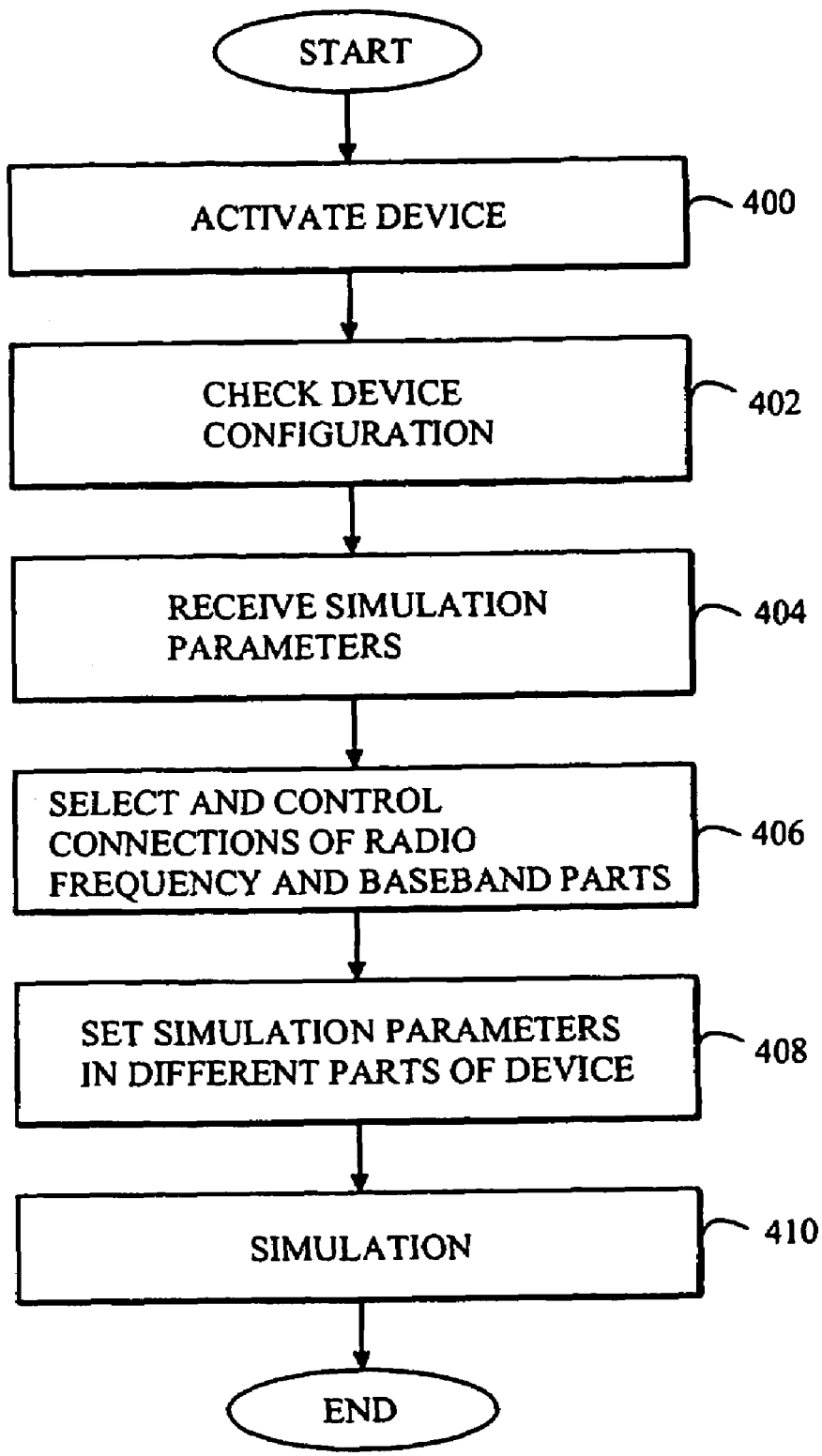
FIG. 4 is a flow chart showing an example of a solution of an embodiment.

In a preferred embodiment of the invention, the channel simulation means of the baseband units are thus divided so that the simulation means of several different baseband parts can simulate the same channel. Let us examine the flow chart shown in FIG. 4 that illustrates the method steps of an embodiment. In this example, it is assumed that the device structure is modular, i.e. the configuration of the device can be altered between different types of simulations to suit each simulation.

In step 400, current is switched on to the device. After this, in step 402, the control means 242 of the device check the current configuration of the device. This way, the control means know what the configuration of the device is, i.e. of which modules the device is constructed. In step 404, simulation parameters are received from the user. This is preferably done by means of suitable interface software, a display and a keyboard. The simulation parameters typically comprise the number of transmitters, the number of receivers, the number of channels to be simulated and their properties. The number of transmitters and receivers is not always the same when a test environment comprises transmission or reception diversity, for instance, or possible interfering transmitters.

In step 406, the control means 242 define, on the basis of the parameters, the connections between the channel elements of the device and transmit the necessary commands to the channel elements by means of the simulation control unit 236 and bus 240. If it turns out, for instance, that there are fewer channels to be simulated than there are channel elements in the device, the system knows that all radio frequency units will not be used and the baseband units corresponding to the unused ones can then be connected parallel to the baseband units corresponding to the used radio frequency units to assist in the channel simulation. Which baseband unit is connected where is selected on the basis of the simulation parameters. For instance, if there is one radio channel to simulate, whose modelling requires several FIR taps, several baseband units can be allocated for this calculation. The channels whose simulation is simple require no extra calculation capacity.

In step 408, the control means 242 transmit, prior to simulation, information on the simulation parameters, such as frequency parameters and gains, to different parts of the device by means of the simulation control unit 236 and along the control bus 240. In step 410, simulation is performed according to the given parameters. The simulation control unit 236 controls the FIR filter taps by means of the bus 238.

Figure 5A:
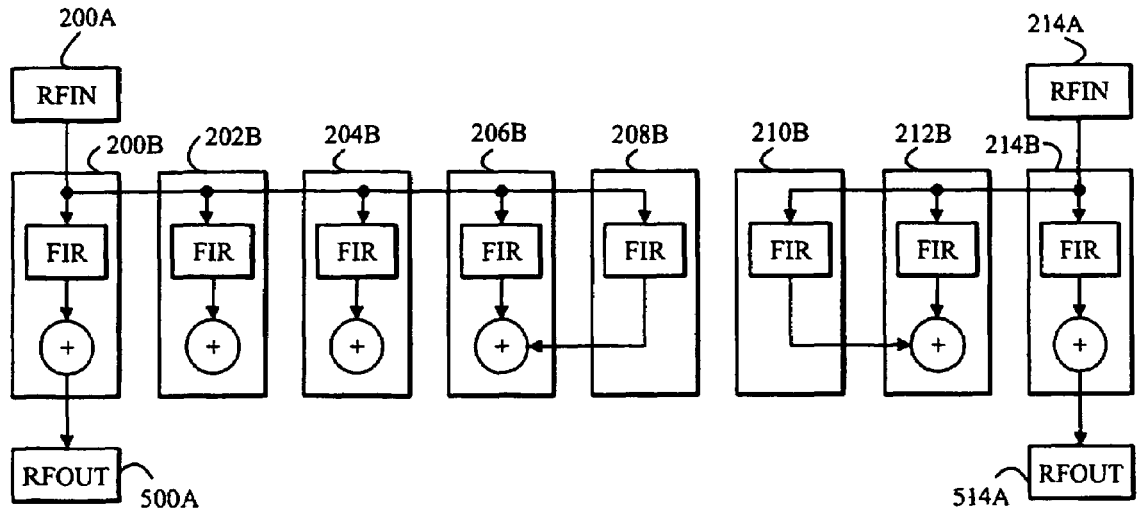
FIGS. 5A and 5B illustrate examples of different connections.
Figure 5B:
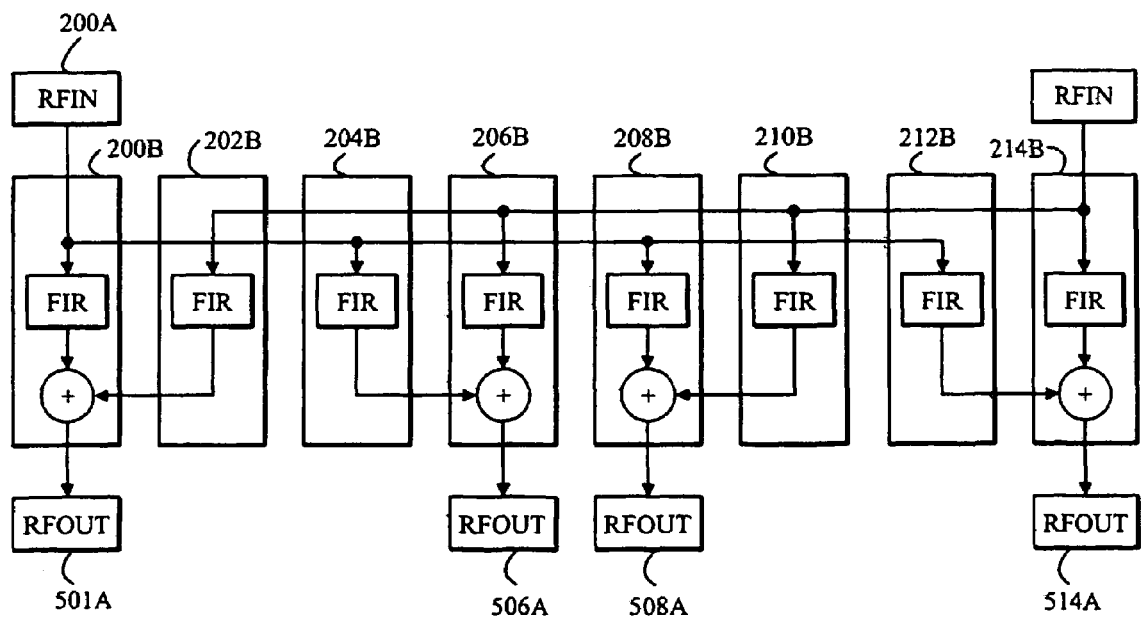

FIGS. 5A and 5B illustrate two examples of different connections in the same equipment but with different simulation parameters. FIG. 5A shows a situation where two radio frequency units 200A and 214A are used. From the first radio frequency unit 200A, the signal is connected to five baseband units 200B to 208B. From the second radio frequency unit 214A, the signal is connected to three baseband units 210B to 214B. From the baseband units, the output signal is taken back to the radio frequency units. To clarify the figure, the receiving radio frequency units 500A and 514A are drawn separate.

FIG. 5B shows a situation where two radio frequency units 200A and 214A are used as signal sources and four radio frequency units 500A, 506A, 508A and 514A are used as signal receivers. In this example, baseband units are connected in a versatile manner between different transmitter/receiver radio units. This way, one and the same physical configuration provides versatile simulation environments in such a manner that the equipment can be efficiently utilized.

Even though the invention has been explained in the above with reference to examples in accordance with the accompanying drawings, it is apparent that the invention is not restricted to them but can be modified in many ways within the scope of the attached claims.

The invention claimed is:

1. A device for performing channel simulation comprising:
a plurality of simulation means, each one of the plurality of simulation means including a corresponding one of a plurality of radio frequency parts and a corresponding one of a plurality of baseband parts, each of the plurality of basebands part being connected to another one of the plurality of baseband parts, and selected ones of the plurality of baseband parts being configured to simulate one of a plurality of radio channels.

2. The device as claimed in claim 1, wherein the device comprises a control means configured to connect inputs and outputs associated with each of the of baseband parts in such a manner that selected ones of the plurality of baseband parts are configured to perform a simulation of the same radio channel.

3. The device as claimed in claim 2, wherein the control means is configured to connect the inputs and outputs of each of the plurality of baseband parts based on at least one parameter of the simulation being performed.

4. The device as claimed in claim 2, wherein the control means is arranged to connect the inputs and outputs of the plurality of baseband parts, and the plurality of radio frequency parts that are not needed during the simulation.

5. The device as claimed in claim 2, wherein the inputs and outputs of the modeling means of the digital module corresponding to each of the plurality of baseband parts is connected to inputs and outputs of a digital module of an adjacent one of the plurality of baseband parts.

6. The device as claimed in claim 1, wherein each of the plurality of baseband parts comprise:
an interface module comprising inputs and outputs of a respective one of the plurality of baseband parts; and
a digital module comprising means for modeling a radio channel.

7. A method for simulating a radio channel, comprising:
simulating at least one radio channel by means of a plurality of channel elements, each one of the plurality of channel elements including a corresponding one of a plurality of radio frequency parts and a corresponding one of a plurality of baseband parts, each of the plurality of baseband parts being connected to another one of the plurality of baseband parts, and selected ones of the plurality of baseband parts being configured to process a signal of one of the plurality of radio frequency parts.

8. The method as claimed in claim 7, the method further comprising:
selecting connections of inputs and outputs associated with the plurality of baseband parts of different ones of the plurality of channel elements based on at least one parameter of a simulation being performed.

9. The method as claimed in claim 8, wherein the connections are to the plurality of baseband parts and the plurality of radio frequency parts that are not needed during the simulation.

10. The method as claimed in claim 8, wherein a channel model affects the connections.

11. The method as claimed in claim 8, wherein a number of the plurality of channel elements used in the simulation affect the connections of the inputs and outputs of the plurality of baseband parts of different ones of the plurality of channel elements.

12. The method as claimed in claim 8, wherein a number of transmitters and receivers are used in the simulation and the connections between the transmitters and receivers affect the connections of the inputs and outputs of the plurality of baseband parts of different ones of the plurality of channel elements.

13. The method as claimed in claim 8, wherein a number of channel elements in the device affects the connections of the inputs and outputs of the plurality of baseband parts of different ones of the plurality of channel elements.

14. The method as claimed in claim 7, comprising:
   checking a configuration of a simulator device after activation;
   receiving at least one simulation parameter from a user;
   selecting a connection of inputs and outputs associated with the plurality of baseband parts of different ones of the plurality of channel elements based on at least one parameter of a simulation being performed;
   setting sets the at least one simulation parameter used in different parts of the device; and
   performing the simulation according to the at least one parameter.

15. A device for performing channel simulation comprising:
   a plurality of radio channel simulators, each one of the radio channel simulators comprising a corresponding one of a plurality of radio frequency parts and a corresponding one of a plurality of baseband parts, each of the plurality of baseband parts being connected to another one of the plurality of baseband parts, and selected ones of the plurality of baseband parts being configured to simulate one of a plurality of radio channels.

* * * * *